Dec. 17, 1946. T. E. BREWER 2,412,711
LOADING CHUTE FOR PICK-UP HAY BALERS
Filed Aug. 28, 1944 2 Sheets-Sheet 1
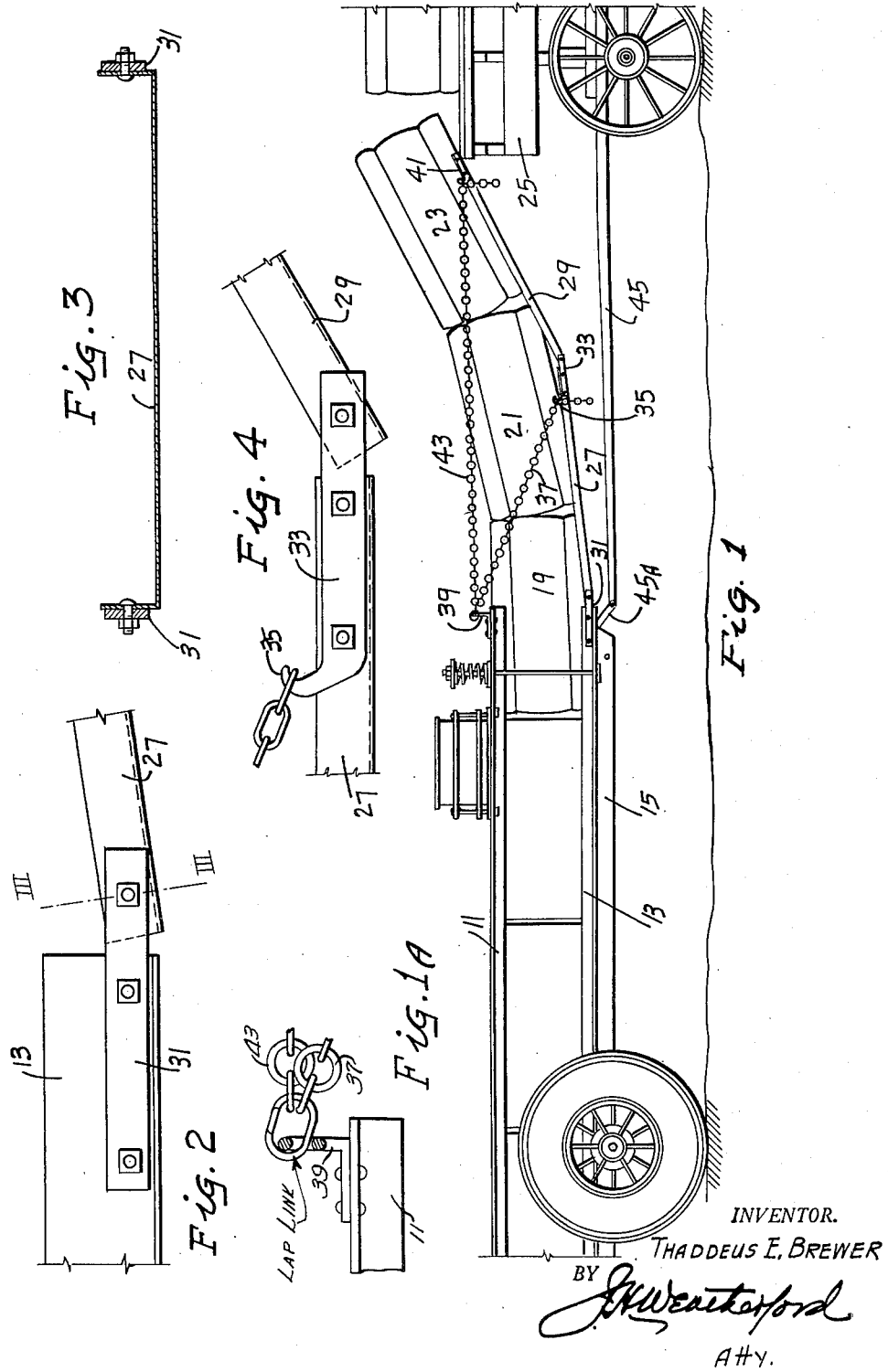
INVENTOR.
THADDEUS E. BREWER
BY
*J. K. Weatherford*
ATY.

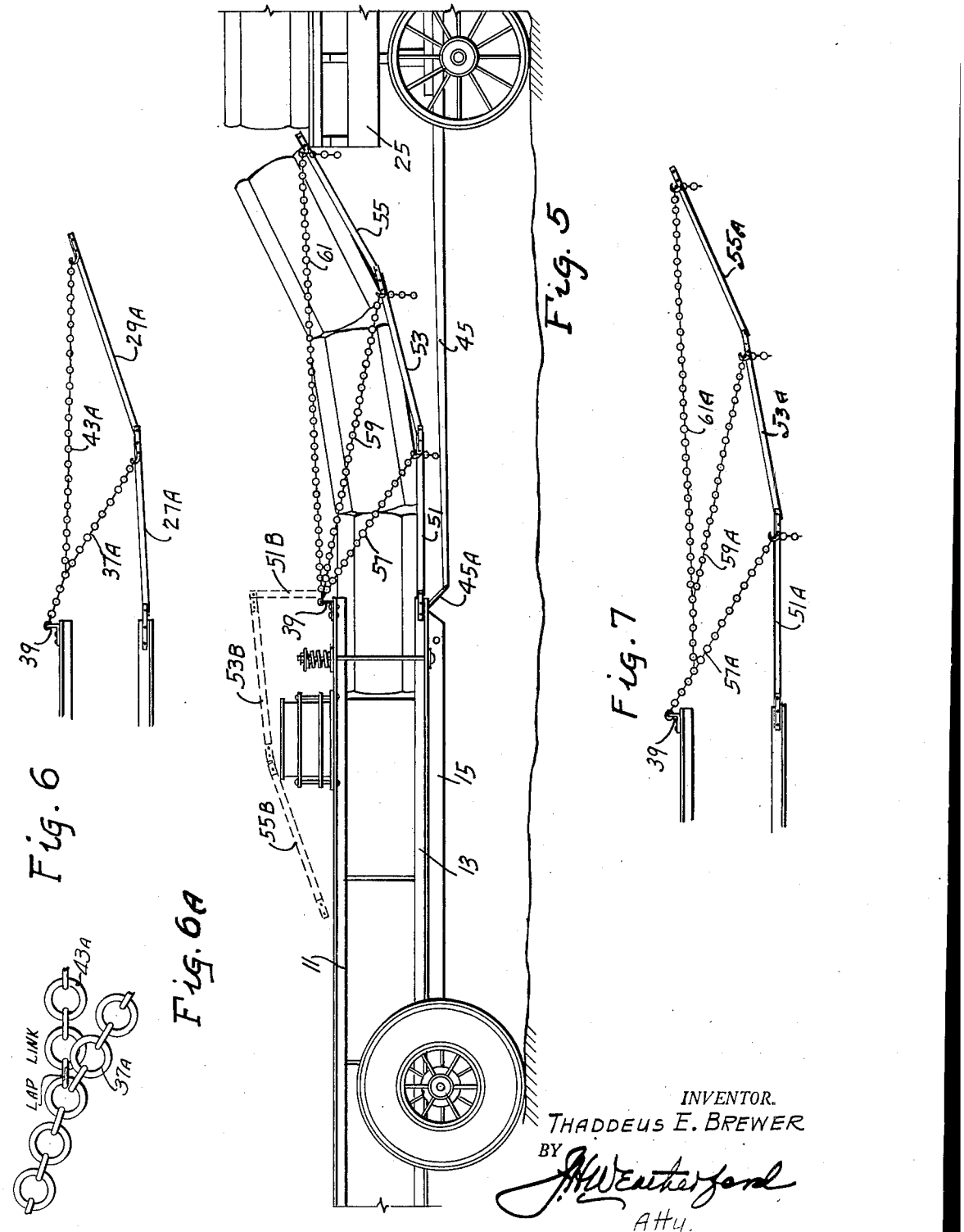

Patented Dec. 17, 1946

2,412,711

UNITED STATES PATENT OFFICE 2,412,711

LOADING CHUTE FOR PICKUP HAY BALERS

Thaddeus E. Brewer, Crittenden County, Ark.

Application August 28, 1944, Serial No. 551,566

4 Claims. (Cl. 100—19)

This invention relates to chutes for transferring bales of hay from a baling press to wagons or the like, by which latter they are hauled away, and has particular reference to the manner in which the chutes are attached to the baling press, and to each other, and are supported.

As is well known, presses for baling hay ordinarily have a power actuated plunger which is reciprocated to effect compression, and extending rearwardly therefrom a rectangular compartment or baling box, in which the hay is compressed, this baling box having a very considerable length. The rear end of the baling box is open and has adjustable friction means for retarding the movement of the bale, whereby each completed bale, as it is pushed along to eventual discharge, forms the abutment against which compression is effected. Balers are of stationary or mobile types.

In this mobile or pick-up type of baler, to which the present invention relates, the entire press and power plant are mounted on wheels, the baling box cantilevering over the rear axle, and the weight of the front portion of the press being sufficient to balance the overhanging load and such additions thereto as the present chute and its load require.

In the operation of the pick-up type baler, the press is moved, usually by a tractor, along the windrows and the hay picked up, fed into, and formed into bales in the press and dropped therebehind as the press progresses along the windrows. Subsequently the bales are picked up, loaded on wagons and hauled away. Not only is extra labor involved in such operation, but actual damage is done to the bales, largely insofar as appearance is concerned, which affects at times the sale appeal and price of the hay.

Loaders are known employing chutes and devices for the support of the chutes, but so far as known, such devices are cumbersome and expensive and require supporting posts or struts which prevent their use for mobile balers where they are most needed. The struts must be collapsed for each minor shift and reestablished before use, and the chutes must be collapsed for transportation from point to point, and so collapsed are so heavy and bulky as to render their removal necessary in many cases.

The objects of the present invention are:

To provide a simple and efficient sectional chute, and means for efficiently and economically securing and supporting same from the press;

To provide supporting means, effective for operatively supporting the chutes during movement of the press along the windrows of hay and concurrent bale forming use of the press; and To provide a sectional chute which is simple and efficient and may be readily and compactly folded for transportation and as readily set up for use.

The means by which the foregoing and other objects are accomplished, and the manner of their accomplishment, will readily be understood from the following specification upon reference to the accompanying drawings, in which:

Fig. 1 is a side elevation of the rear end of a hay baling press and the forward end of a wagon being loaded with a two section chute, in accordance with the present invention, therebetween and in use.

Fig. 1A is a detail view illustrating the connection of the supporting means for one such chute section.

Fig. 2 is an enlarged view of one of the hinge members, attaching the plate to the press.

Fig. 3 is a transverse section of the chute and hinge members on the line III—III of Fig. 2.

Fig. 4 is an enlarged view of an intermediate hinge member and hook.

Fig. 5 is a side elevation similar to Fig. 1, showing a three section chute; and Figs. 6 and 7 fragmentary views showing minor modifications of the hook-up of the chute supporting means.

Fig. 6A is a detail view illustrating the hook-up of the chute supporting means.

Referring now to the drawings in which the various parts are indicated by numerals:

11 and 13 are frame members of the press baling box, and 15 a usual frame member. 19, 21 and 23 indicate bales of hay, the bale 19 being still partially in the baling box. 25 indicates the wagon on which the bales are being loaded.

27 and 29 are the chute sections, each thereof as shown in cross section, in Fig. 3, being a shallow metal channel of the width, or slightly wider, than the baling box. Chute 27 is positioned immediately rearward of the baling box and secured at its forward end to the loader frame members 13 by straps 31 which are solidly attached to the frame members by bolts or rivets, and project rearwardly therefrom alongside the channel 27; and are pivotally secured by bolts or rivets to the channel, the lateral stiffness of the chute and the pivotal attachment through the straps effecting a hinge joint which prevents side deflection and positive transfer of end thrust of the baling box frame members.

At its rear end the chute 27 carries on its opposite sides a pair of straps 33 which are secured rigidly to the chute by bolts or rivets, and project beyond the end of the chute and are pivotally connected to the chute 29 by bolts or rivets which effect a hinge joint, similar to the first mentioned hinge joint, and likewise prevent displacement of the chute 29 from longitudinal alinement with the chute 27, and yet allow freedom of vertical movement, it being particularly noted that both the hinge connection of the chute 27 and the chute 29 is such that the lower or front end of the chutes are downwardly displaced below the level of the adjoining rear ends of the baling box and chute respectively to avoid any danger of hanging when the shift of the bale from the baling box to the first chute and from the first chute into the second chute occurs.

The straps 33 are provided with integral hook portions 35 which are coupled through supporting chains 37 to suitable anchor members as angle irons 39 on the outer end of the upper frame member 11 of the baling box and form a rigid support for the chute 27. The chute 29 is provided adjacent its outer end with quite similar strap and hook members 41, which are similarly connected by chains 43 to the same anchor members 39, the angularity of the chutes 27 and 29 being regulated in desired manner by the length of chains used and being made such that the rear end of the chute 29 is very slightly above the level of the bed of the wagon 25, the wagon being coupled through a tongue 45, and linkage 45A, to the back end of the baling box in such manner that the outer end of the chute 29 will slightly overlie the wagon bed and may provide an additional support for that chute under load.

Fig. 5 is a quite similar set-up in which three sections 51, 53, and 55, of chute are used, the sections being respectively supported at their rear ends by chains 57, 59 and 61, which are coupled to the anchor members 39 on the baling box, as before, this set-up providing for a slightly greater distance between the wagon 25 and the end of the baling box and giving in some cases more satisfactory angular relations of the chutes. Removal of the intermediate chute 53 and coupling of the chute 55 to the chute 51 establishes the chute structure shown in Fig. 1.

It will be understood that the coupling of the chains 43, of Fig. 1, to the anchor members 39 may be made, as shown in Fig. 6, by coupling the end links of the chains 43A into links of the chains 37A, near the anchor members 39 rather than directly to the anchor members 39, such coupling effecting a possibility of adjustment of the chutes under load and permitting the shifting of the chute 27A to a substantially horizontal position by straightening of the chains 37A, as where upward deflection of the outer end of the bale being forced from the press, is objectionable.

In Fig. 7 a chute is shown having three sections, 51A, 53A, 55A, supported at their outer ends by chains 57A, 59A, 61A respectively, chains 59A being connected to chains 57A near the anchor members 39 and chains 61A into chains 59A near their junctions with chains 57A.

It will be understood that other flexible connectors or supports may be used instead of chains, should it be so desired, chains, however, because of the ease of the adjustment of their lengths, being most satisfactory.

Fig. 5 also shows dotted positions 51B, 53B and 55B of the chutes as they are folded over onto the baling box when not in use, or where any considerable shift of the hay press is being made, as from one field to another, the hinge connections of the chutes allowing such folding, and it not being necessary to disconnect the chains, although to simplify the drawings the chains are not shown in such folded position.

In making use of the device, the wagon is coupled through the tongue 45 and the coupling link 45A, of desired length, with the rear end of the press, the rear end of the supported chutes being adjusted in height to clear the top of the wagon bed and very slightly overlying the same. The press discharges the bales as formed directly into the chutes and forces them rearwardly and upwardly into the wagon bed where they are shifted and piled, as may be desired, the resistance of the bales to the shift being utilizable as a part of the resistance against which compression is effected in the press. Obviously, if such resistance effects too great resistance in the press, the rear end of the baling box may be correspondingly loosened to compensate.

In operation the press, with the chute in operating position, and the wagon coupled to the press, are pulled as a unit along the windrows of hay, which is picked up as the movement of the press continues and fed directly into the baling box of the press where it is compressed into bales without interruption of the progress of the press along the windrows. The completed bales are forced backward and upward through the chutes and onto the platform or bed of the wagon and there further shifted, if necessary, by hand. When the wagon is loaded, progress and operation of the press are interrupted, the wagon detached and pulled to one side, another wagon coupled on and operation resumed.

I claim:

1. The combination with a baling press, including a baling box open for discharge at its rear end, a loading chute, comprising sections of shallow channel cross section, longitudinally alined rearwardly of said box, rigid straps secured respectively along opposite sides of the bottom of said baling box, and of said chute sections at their respective rear ends, and respectively projecting rearwardly therefrom, said chute straps having at their forward ends each an upwardly extending hook, pins pivotally hinging the forward ends of said chute sections to said straps, and flexible linkage respectively connected to said chute strap hooks and to the upper rear end of said baling box, to complete the support of said chute.

2. A chute support in accordance with claim 1, in which the members comprising said flexible linkage are chains.

3. The combination with a baling press having a baling box, open for discharge at its rear end, a loading chute, comprising a plurality of sections of shallow channel cross section, longitudinally alined rearwardly of said box, means secured respectively along opposite sides of the bottom of said baling box, and of said chute sections at their respective rear ends, pivotally engaged with the adjacent forward ends of said chute sections, flexible linkages respectively connecting the rear ends of said chute sections to the top rear end of said baling box, the linkages of the said chute section adjacent said baling box extending directly to said baling box, and each successive said linkage establishing its said coupling through the preceding one of said linkage.

4. Chute coupling means in accordance with claim 3, in which the members comprising said flexible linkage are chains.

THADDEUS E. BREWER.